C. V. TRAUTMAN & E. HOLMES.
BALE TIE.
APPLICATION FILED MAY 21, 1908.

906,584.

Patented Dec. 15, 1908.

Cornelius V. Trautman
Everett Holmes
Inventors

Witnesses:

By C.A. Snow & Co
Attorneys.

UNITED STATES PATENT OFFICE.

CORNELIUS V. TRAUTMAN AND EVERETT HOLMES, OF MEDORA, INDIANA.

BALE-TIE.

No. 906,584.      Specification of Letters Patent.      Patented Dec. 15, 1908.

Application filed May 21, 1908. Serial No. 434,120.

*To all whom it may concern:*

Be it known that we, CORNELIUS V. TRAUTMAN and EVERETT HOLMES, citizens of the United States, residing at Medora, in the county of Jackson, State of Indiana, have invented a new and useful Bale-Tie, of which the following is a specification.

This invention relates to bale ties of that class wherein the ends of a length of wire are provided with interlocking members to hold the tie positioned around a bale of hay.

The object of the present invention is to provide an improved bale tie of this character in which the assembling of the tie terminals will be facilitated and their locking together rendered of the highest stability.

With the above and other objects in view, as will appear as the nature of the invention is better understood, the same consists in the novel form of bale tie, as will be hereinafter fully described and claimed.

Figure 1:
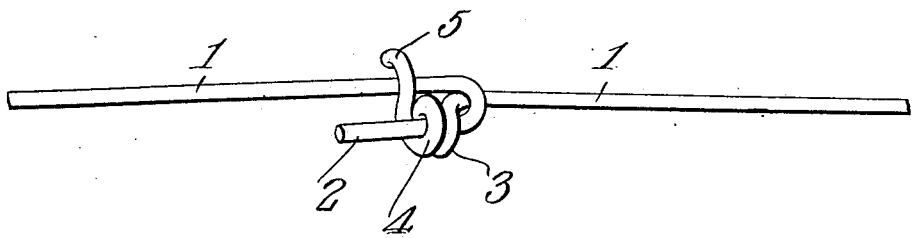
Figure 2:
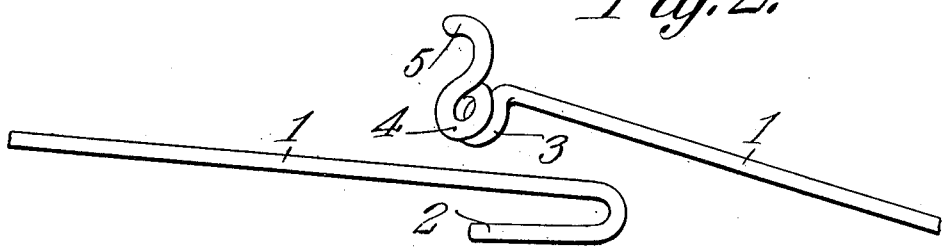
Figure 3:
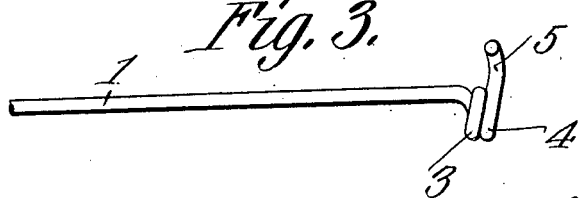

In the accompanying drawings forming a part of this specification, and in which like characters of reference indicate corresponding parts, Figure 1 is a view in perspective showing the two ends of a bale tie connected by the locking members constituting the novelty of the present invention. Fig. 2 is a similar view showing the two locking members disconnected. Fig. 3 is a view in side elevation of one of the locking members.

The bale tie 1 is constructed from a length of wire of any suitable gage, and is provided at one end with a hook, the bill 2 of which is disposed approximately parallel with the adjacent wire. The other end of the wire is formed into a plurality of whirls, in this instance two, designated 3 and 4, the axes of which are substantially parallel to the length of the wire, the whirl 4 terminating in a hook 5 disposed substantially at right angles to the length of the wire.

In assembling the two ends of the ties, the bill 2 of the hook is passed through the whirls 3 and 4 and the hook 5 is passed over the adjacent wire, and by this arrangement it will be seen that any spreading of the hook 2 due to longitudinal strain, will be positively precluded by means of the hook 5. Owing to the disposition of the whirls, that is, by arranging them at right angles to the length of the wire, the orifices formed by the whirls will be in approximate alinement with the wire, so that the introduction of the bill 2 of the hook through the orifices will be an easy matter and will require no skill whatever in accomplishing.

All of the parts of the tie, as will be readily apparent by reference to Fig. 1, are mutually braced, so that spreading or disconnection due to the strains to which they will be subjected in use will be positively precluded.

What is claimed is:—

1. A bale tie comprising a length of wire having one end bent to form a hook and its other end formed into a plurality of whirls, the axes of which are substantially parallel to the length of the wire and terminating in a wire-engaging hook disposed substantially at right angles to the length of the wire.

2. A bale tie comprising a length of wire having one end bent to form a hook, the bill of which is disposed in approximate parallelism with the adjacent wire and its other end formed into a plurality of whirls, the axes of which are substantially parallel with the length of the wire and being arranged to receive the said bill, one of the whirls terminating in a wire-engaging hook disposed substantially at right angles to the length of the wire.

In testimony that we claim the foregoing as our own, we have hereto affixed our signatures in the presence of two witnesses.

CORNELIUS V. TRAUTMAN.
      EVERETT HOLMES.

Witnesses:
  C. C. MCMILLAN,
  THOMAS H. CHASE.